United States Patent [19]
Bodenmann et al.

[11] Patent Number: 5,881,366
[45] Date of Patent: Mar. 9, 1999

[54] WIRELESS PERIPHERAL INTERFACE

[75] Inventors: Olivier Bodenmann, Assens; Florian Kehlstadt, Denens; Nicolas Sasselli, Lausanne, all of Switzerland; Dennis Lee, Chung-Li, Taiwan

[73] Assignee: Logitech, Inc., Fremont, Calif.

[21] Appl. No.: 640,665

[22] Filed: May 1, 1996

[51] Int. Cl.⁶ .................. H04B 7/00; H04J 3/16
[52] U.S. Cl. .................. 455/66; 370/470; 395/286
[58] Field of Search .................. 455/66, 512, 527, 455/466; 395/286, 882, 883; 370/349, 465, 468, 470, 471, 449

[56] References Cited

U.S. PATENT DOCUMENTS

| | | | |
|---|---|---|---|
| 4,409,479 | 10/1983 | Sprague et al. | 250/237 G |
| 4,428,078 | 1/1984 | Kuo | 455/3 |
| 4,521,772 | 6/1985 | Lyon | 340/710 |
| 4,586,175 | 4/1986 | Bedard et al | 370/449 |
| 4,631,400 | 12/1986 | Tanner et al. | 250/221 |
| 4,751,505 | 6/1988 | Williams et al. | 340/710 |
| 4,754,268 | 6/1988 | Mori | 340/710 |
| 4,860,292 | 8/1989 | Newman et al. | 395/286 |
| 4,924,216 | 5/1990 | Leung | 340/709 |
| 4,979,095 | 12/1990 | Ghaffari | 395/286 |
| 5,027,348 | 6/1991 | Curry, Jr. | 370/470 |
| 5,098,110 | 3/1992 | Yang | 273/438 |
| 5,339,095 | 8/1994 | Redford | 345/158 |
| 5,349,139 | 9/1994 | Verrier et al. | 178/19 |
| 5,375,119 | 12/1994 | Koivu | 370/470 |
| 5,550,987 | 8/1996 | Tanaka | 395/286 |
| 5,623,271 | 4/1997 | Ponnapalli | 343/895 |
| 5,682,379 | 10/1997 | Mahany et al. | 370/465 |

*Primary Examiner*—Reinhard J. Eisenzopf
*Assistant Examiner*—Sam Bhattacharya
*Attorney, Agent, or Firm*—Fenwick & West LLP

[57] ABSTRACT

A method and apparatus for establishing a standardized communications protocol for wireless communications between a host and one or more peripheral devices such as joysticks, mice, gamepads, remote controllers or other devices including establishing a standard message format for messages communicated between a host and the peripheral devices, establishing a plurality of unique data types for associated peripheral devices, and prioritizing communications between the host and such peripherals to permit rapid and effective communication therebetween.

14 Claims, 7 Drawing Sheets

SHORT_ID=

| X0 | X1 | X2 | X3 | X4 | X5 | X6 | X7 | XS | Y0 | Y1 | Y2 | Y3 | Y4 | Y5 | Y6 | Y7 | YS |

FIG. 10A

| h0 | h1 | f | meaning: |
|----|----|---|----------|
| 1  | 0  | 0 | autofire pattern in b0..b5 (no time_out) |
| 0  | 1  | 0 | continuously depressed pattern in b0..b5 (no time out) |
| 1  | 1  | 0 | reserved |
| 0  | 0  | 0 | hat idle |
| 0  | 0  | 1 | hat down |
| 0  | 1  | 1 | hat up |
| 1  | 0  | 1 | hat left |
| 1  | 1  | 1 | hat right |

FIG. 10B

| X0 | X1 | X2 | X3 | X4 | Xs | Y0 | Y1 | Y2 | Y3 | Y4 | Ys |

FIG. 11A

| actual displacement | transmitted code | | | | | | decoded displacement |
|---|---|---|---|---|---|---|---|
| 0 | 0 | 0 | 0 | 0 | 0 | 0 | 0 |
| +/-1 | 1 | 0 | 0 | 0 | 0 | 0/1 | +/-1 |
| +/-2 | 0 | 1 | 0 | 0 | 0 | 0/1 | +/-2 |
| +/-3 | 1 | 1 | 0 | 0 | 0 | 0/1 | +/-3 |
| +/-4 | 0 | 0 | 1 | 0 | 0 | 0/1 | +/-4 |
| +/-5 | 1 | 0 | 1 | 0 | 0 | 0/1 | +/-5 |
| +/-6 | 0 | 1 | 1 | 0 | 0 | 0/1 | +/-6 |
| +/-7 | 1 | 1 | 1 | 0 | 0 | 0/1 | +/-7 |
| +/-8 | 0 | 0 | 0 | 1 | 0 | 0/1 | +/-8 |
| +/-9 | 1 | 0 | 0 | 1 | 0 | 0/1 | +/-9 |
| +/-10 | 0 | 1 | 0 | 1 | 0 | 0/1 | +/-10 |
| +/-11 | 1 | 1 | 0 | 1 | 0 | 0/1 | +/-11 |
| +/-12 | 0 | 0 | 1 | 1 | 0 | 0/1 | +/-12 |
| +/-13 | 1 | 0 | 1 | 1 | 0 | 0/1 | +/-13 |
| +/-14 | 0 | 1 | 1 | 1 | 0 | 0/1 | +/-14 |
| +/-15 | 1 | 1 | 1 | 1 | 0 | 0/1 | +/-15 |
| +/-16..17 | 0 | 0 | 0 | 0 | 1 | 0/1 | +/-16 |
| +/-18..19 | 1 | 0 | 0 | 0 | 1 | 0/1 | +/-18 |
| +/-20..21 | 0 | 1 | 0 | 0 | 1 | 0/1 | +/-20 |
| +/-22..23 | 1 | 1 | 0 | 0 | 1 | 0/1 | +/-22 |
| +/-24..25 | 0 | 0 | 1 | 0 | 1 | 0/1 | +/-24 |
| +/-26..27 | 1 | 0 | 1 | 0 | 1 | 0/1 | +/-26 |
| +/-28..29 | 0 | 1 | 1 | 0 | 1 | 0/1 | +/-28 |
| +/-30..31 | 1 | 1 | 1 | 0 | 1 | 0/1 | +/-30 |
| +/-32..39 | 0 | 0 | 0 | 1 | 1 | 0/1 | +/-32 |
| +/-40..47 | 1 | 0 | 0 | 1 | 1 | 0/1 | +/-40 |
| +/-48..55 | 0 | 1 | 0 | 1 | 1 | 0/1 | +/-48 |
| +/-56..63 | 1 | 1 | 0 | 1 | 1 | 0/1 | +/-56 |
| +/-64..79 | 0 | 0 | 1 | 1 | 1 | 0/1 | +/-64 |
| +/-80..95 | 1 | 0 | 1 | 1 | 1 | 0/1 | +/-80 |
| +/-96..111 | 0 | 1 | 1 | 1 | 1 | 0/1 | +/-96 |
| +/-112..127 | 1 | 1 | 1 | 1 | 1 | 0/1 | +/-112 |

*FIG. 11B*

| K0 | K1 | K2 | K3 | K4 | K5 | K6 | K7 | K/s | B0/K8 | B1/K9 | 0 | 0 | 0 | 0 | D |

FIG. 12

| K0 | K1 | K2 | K3 | K4 | K5 | K6 | Shift | Alt | Ctrl | 0 | 0 | 0 | D |

FIG. 13

| K0 | K1 | K2 | K3 | K4 | K5 | K6 | Shift | Alt | Ctrl | 0 | 0 |

FIG. 14

| REG#0 | REG#1 | ... | REG#3 | REGd0 | REGd1 | ... | REGd15 |

FIG. 15

| REG#0 | REG#1 | ... | REG#3 |

FIG. 16

| CRC3 | CRC2 | CRC1 | CRC0 |

WIRELESS PERIPHERAL INTERFACE

SPECIFICATION

FIELD OF THE INVENTION

This application relates to methods and apparatus for communicating with peripheral devices and controllers, and particularly relates methods and apparatus for wireless communications with such devices.

BACKGROUND OF THE INVENTION

As the use of personal computers has been more ubiquitous in all phases of professional and personal life, and with the increasing popularity of graphical user interfaces for both personal computers and workstations, the need for sophisticated methods of communication between a peripheral and a host system has become more fundamental to the successful operation of the overall system. The variety of available peripherals has expanded dramatically with the increasing power available from the microprocessors available for such systems, but peripherals such as keyboards, mice, trackballs, touchpads, gamepads, joysticks, remote-controllers, and so on are well-known for use with host systems of many types, including PC's, workstations and other types of microprocessor-controlled devices including video game systems, or other office or household devices. To operate in conventional environments, each of these peripherals is connected to its host system via a hardware port. In addition, in conventional systems, the peripherals communications with the host through a substantially proprietary protocol.

While such communications protocols between conventional host systems and peripherals have been very successful at bringing substantial power and flexibility to the user, they do suffer from some limitations. Among others, most host systems have only a limited number of available ports, and cannot share such ports for substantially simultaneous operation with a number of peripherals. This imposes significant limitations on the flexibility with which the system can be used. For example, if only two serial ports are available, only two serial peripherals can be simultaneously connected to the host system. Similarly, and particularly applicable to interactive devices such as modern video games or teaching environments, it has been difficult to permit multiples of players to communicate with a host system in a substantially simultaneous manner without providing a separate communications channel for each such device.

Devices which communicate with their host systems without hard-wired connections are also well known in the art. Infrared remote control devices for use with modern home electronics such as a television, VCR or stereo are readily available in the marketplace. However, such devices have little computational power, and basically use relatively simple protocols to communicate to a host which of several buttons have been depressed by the user of the remote device. The oft-criticized IBM PC Jr implemented a wireless keyboard using infrared techniques, but suffered because the infrared link needed to be pointed almost precisely at the associated receiver on the host to maintain communications. This proved to be difficult to achieve, leading to abandonment of the design. In general, infrared devices can operate only if they are pointed substantially in the direction of the receiver, which is usually at or near the host system.

More recently, other wireless devices have been introduced. One well-known device is the Logitech MOUSE-MAN CORDLESS, which uses an RF communications link. In addition, various other infrared and RF devices by various other manufacturers are known in the art. However, while these devices have been very effective at providing communication between a single peripheral and an associated host, they have not provided the broader solution necessary to connect multiple types of devices to the host, nor have they permitted concurrent connection of multiple devices to the host.

There has therefore been a need for a method and apparatus capable of permitting multiple peripheral devices to communicate with a host system in a substantially simultaneous manner.

SUMMARY OF THE INVENTION

The present invention substantially overcomes the limitations of the prior art by providing a protocol which permits connection (including concurrent connection) of multiple peripheral devices, including not only multiple types of devices but also multiple devices of the same type, to a single host. The host may be any type of microprocessor-controlled system, but particularly includes personal computers, workstations, game consoles, and other consumer electronics. The peripherals may be of any sort, although the invention is particularly well-suited to pointing devices such as electronic mice, trackballs, touch pads or joysticks, game controllers, keyboards, or other types of remote controllers or remote peripherals.

In one embodiment, the method of the present invention is designed for low range (i.e., typically less than 20 meters) RF or IR range between the host and the peripheral. The method includes means for providing either uni-directional or bidirectional communications between a host and a peripheral, depending on the type of peripheral connected, as well as means for providing sufficient bandwidth to support multiple devices of different types. At the same time, techniques are provided to permit a host to always identify the source of the incoming data, that is, which peripheral of the several that may be connected is sending the current signal. In this manner it is possible to comply with various Plug and Play specifications while also permitting simultaneous connection of multiple devices.

In addition, certain peripherals are permitted to transmit multiple data types, while at the same time permitting the host to continue recognizing the source of such signals. Likewise, certain types of peripherals requiring faster communications links can be allowed to communicate with their associated host by means of "shortcut" messages in combination with full length messages. Further, priority is given, under the protocol of the present invention, to devices requiring such priority for successful operation.

It is one object of the present invention to provide an improved communications method by which a host system can communicate with associated plural peripherals.

It is another object of the present invention to provide a method for wireless communication between a host system and one or more connected peripherals which transmits to the host sufficient device information to permit plug and play operation of such peripheral.

These and other objects of the invention will be better understood from the following Detailed Description of the Invention, taken together with the appended drawings.

FIGURES

FIG. 10C shows in table form the encoding for hat position, auto-fire and continuously on patterns for the data structures of FIG. 10A.

DETAILED DESCRIPTION OF THE INVENTION

Figure 1:
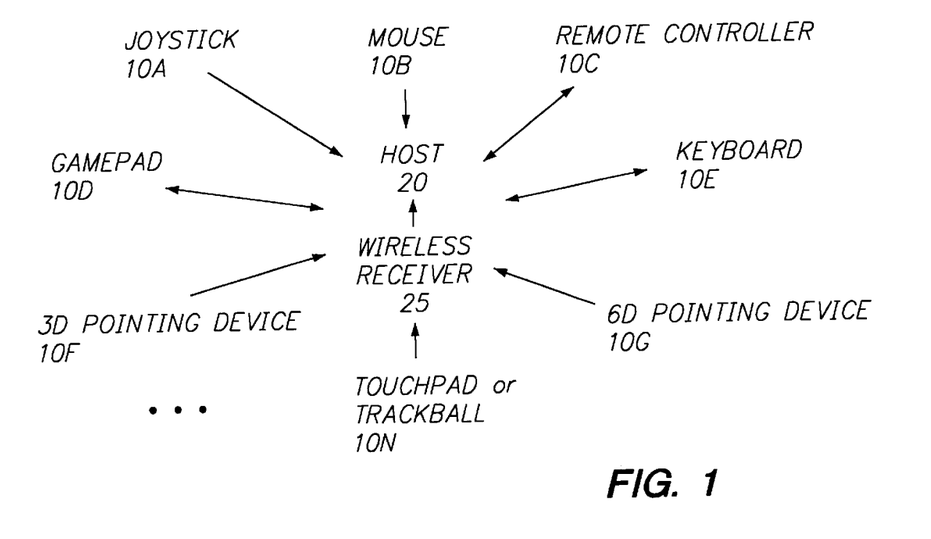
FIG. 1 shows a plurality of peripherals devices connected to a host system in accordance with the present invention.
Figure 2:
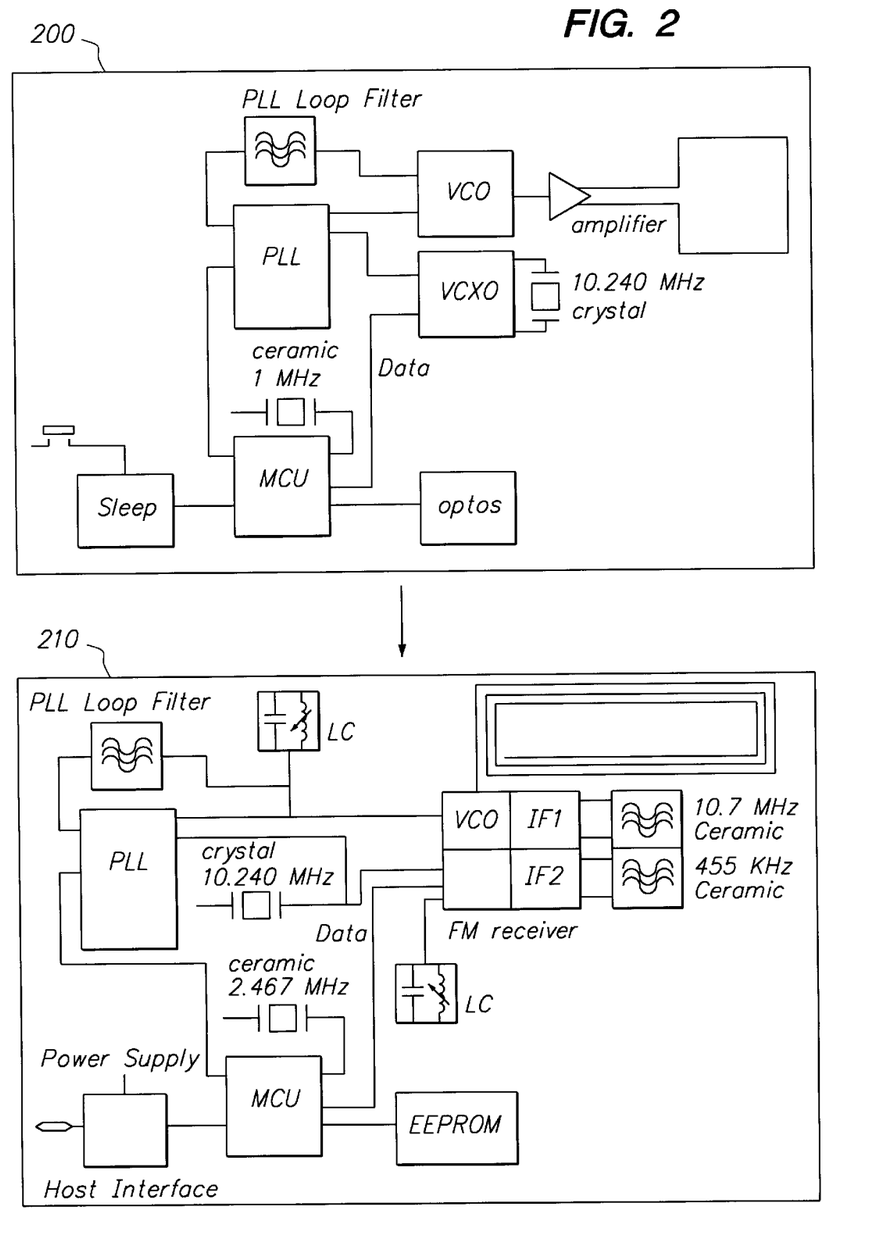
FIG. 2 shows in schematic block diagram form a receiver/ transmitter pair, one associated with a host and another with a peripheral, in accordance with the present invention.

Referring first to FIGS. 1 and 2, a plurality of peripheral devices 10A–10n may be seen to be communicating substantially simultaneously with a host system 20. In particular, a keyboard, electronic mouse, trackball, touchpad, joysticks, game controllers, and keyboard are all shown communicating with a single host 20 via a wireless receiver 25. With particular reference to FIG. 2, a transmitter/receiver pair are shown at 200 and 210, respectively. A suitable transmitter/receiver pair is described in U.S. patent application No. 08/250,461, filed May. 27, 1994, entitled WIRELESS MOUSE and assigned to the assignee of the present invention, the relevant portions of which are incorporated by reference. For bidirectional communications, which is also included within the scope of the present invention, each device may include both a transmitter and receiver.

The link between the peripherals and the host may be either infrared or radio frequency, depending on various implementation criteria, and may also be unidirectional (i.e., device to host only) or bi-directional. For example, the constraints on using an infrared link include the requirement for a clear line of sight (slightly less of a concern with diffused IR rather than directive IR); the directivity of the transducers (where the more directive the more sensitive to obstacles and device orientation; the less directive, the more power consumed to maintain operation over an acceptable range); the tradeoff between high power consumption during signal emission versus maintaining an acceptable transmission range; and the susceptibility of IR sources to noise during modulation, where noise can be caused either by fluorescent lighting or other infrared devices. In addition, only one device can emit at a given time to avoid collisions; similarly, bi-directional communication can occur only in half-duplex mode.

As noted previously, the primary alternative to infrared communication is radio frequency communication. However, this approach is also constrained in several ways. One limitation is the requirement for DC-free encoding; another is the need to limit signal bandwidth to the band authorized by the FCC and Telecon regulations. In addition—but as with infrared devices—only one single device can emit at a time, and bi-directional communications work only in half-duplex mode.

In a presently preferred embodiment, varying latency periods are associated with the various device types which may be configured to communicate with a host in accordance with the present invention. In addition, various reports will need to be emitted from the peripheral to the host, and those reports will typically have a maximum report period and a maximum duration. Thus, for example, reports will typically be generated for any of a variety of user actions, including depressing or releasing a key, moving a pointing device, and so on. For gamepads (or non-multiplexed switches) the maximum latency added by the addition of a wireless link will be on the order of 25 ms per gamepad in unidirectional mode, with an additional latency of another 25 ms for multiple gamepads. The maximum report period for such a device typically will be on the order of 25 ms for all but systems using multiple pads, where 50 ms may be acceptable. Gamepads typically consist of a number of switches which can either be depressed or released, with a report generated each time a change occurs in the state of any of the switches.

For devices such as joysticks, which can be characterized as "XY-absolute position with switches," slightly different latency characteristics may be associated with the wireless protocol of the present invention. In this instance, a 30 ms latency is typical for a single uni-directional joystick, while two joysticks synchronized in bidirectional mode may have a latency of 50 ms. The maximum report period is preferably on the order of 25 ms, while the individual joystick report (including the inter-frame no-emission period) is preferably no longer than 22 ms, to ensure that two joysticks can send their reports in turn and still allow the receive to send its synchronization string. Should additional joysticks be utilized simultaneously, a short report duration may be required, or other characteristics changed. Joystick-type devices, which may also include tablets and pens, include X absolute position, Y absolute position, and a plurality of switches similar to those on game controllers. A report is generated any time either position or the state of any switch changes.

Mice and other relative-displacement devices may have somewhat different latency and reporting characteristics in the present invention. While a mouse operating alone may have a 20 ms latency period for the wireless protocol of the present invention, it may be increased to 30 ms if the mouse is synchronized with a keyboard. A typical maximum report period may be on the order of 22.5 ms to 30 ms, again depending on whether synchronized with a keyboard, The maximum report duration may also vary depending on whether the pointing device is synchronized with a keyboard, which typically represents the worst case. In such an instance, the report length preferably will not exceed 12.5 ms, including the no-emission period, to allow time for the receiver to send back a "synchro polling and achnowledge" string and still allow the keyboard to send its report, all within a total maximum report period on the order of 30 ms. Mice and other relative displacement devices are similar to joysticks, except that they report relative X and Y displacement rather than absolute position, with a report generated any time a change in relative displacement or a switch state occurs.

Other devices, such as 3D or 6D position devices, may have latency periods on the order of 40 ms, with maximum report periods on the order of 35 ms. Similar to both mice and joysticks, such devices may report both switch state and either absolute position or relative displacement. As before, such reports are typically generated only in the event of a change. Remote controllers, which may also be characterized as asynchronous encoded key switches, may have latency periods on the order of 50 ms, with maximum report periods of 100 ms. Such devices include keys encoded by physical position (scancode) or by an associated logical value, plus other encoding such as the number of the encoding bank, as well as "depressed" or "released" information, with reporting of each change. Keyboards, which can be characterized as polled-encoded key switch devices, typically have a latency period on the order of 50 ms and a maximum report period of 30 ms, which can be recognized as 33 reports per second. Like the mouse discussed above, the report duration for a keyboard should be on the order of 12 ms. Keyboards report whether a key has been depressed or released, with the actuated key encoded by logical value, plus a few special function keys.

The protocol of the present invention is equally applicable to both IR and RF operation. If an IR implrementation is preferred, the carrier wavelength will typically be within the range of 850–950 nm, and may be within the IRDA range of 850–900 nm. The carrier frequency may vary widely, but will typically fall within the range of 30–56 kHz. The LED-on time typically varies between 3 $\mu$s to 50% of the carrier period. A shorter on time provides better power savings, while a longer on time provides better range, with the exact on time being determined in accordance with a specific implementation. In some instances, adaptive criteria may be used to determine on time. Any suitable modulation technique is acceptable, such as FSK, PSK, Q-PSK or others, although ASK is presently preferred because components implementing this technique are readily available.

In addition, while a variety of data encoding algorithms may be used, at present Miller "Delay Modulation" encoding is preferred, at a rate on the order of 2400 bps and a no-emission time of 2.5 bits minimum at the receiver side. Any suitable directivity may be used, with such directivity controlled in a manner known in the art.

In the event an RF implementation is preferred, the carrier will preferably be on the order of 27 MHz, 433.92 MHz or 916.5 MHz, although any suitable frequency will be acceptable. While ASK modulation is presently preferred, as noted above in connection with the IR implementation, other known forms of modulation are also acceptable. Also as with the IR implementation, data encoding usin Miller "Delay Modulation" with determined start and end sequences is presently preferred, to assist the AGC of the receiver circuitry in obtaining better reception of the incoming signal.

Figure 3:
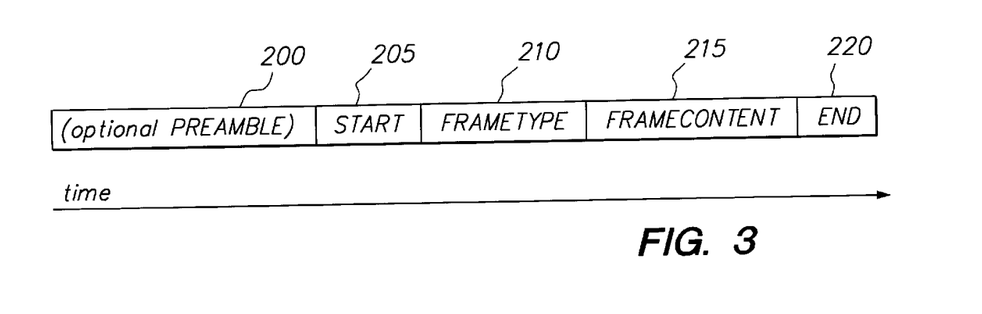
FIG. 3 shows the general frame structure of a transmission according to the protocol of the present invention.

Regardless whether IR and RF carriers are used, messages sent between the peripheral and the host in accordance with the protocol of the present invention all have a common frame structure, shown in FIG. 3. The general frame structure of any message sent in accordance with the present invention includes an optional PREAMBLE 200, a START field 205, a FRAMETYPE field 210, a FRAMECONTENT field 215, and an END field 220. The optional PREAMBLE 200, as well as the START and END fields 205 and 220, respectively, are all determined in accordance with the Miller "Delay Modulation" encoding algorithm. The START field 205 may be of any suitable type, with the intent that it be easily recognizable as a start sequence while also providing synchronization information. Because the end of the START field is subject to sliding, the beginning of the START field 205 should give the first synchronization information at the receiver side. An exemplary START field which has been established as acceptable includes a sequence of 3 periods (T) emitting followed by 2 periods (T) non-emitting. The END field 220 is used only to terminate properly at the no-emission state; in an exemplary embodiment it has no synchronization function. The optional PREAMBLE 200 preferably should be readily distinguishable from the START field 205, while at the same time short enough to avoid wasting battery life. A sequence of 10T emitting plus 4T non-emitting has been found acceptable in an exemplary embodiment.

Figure 4:
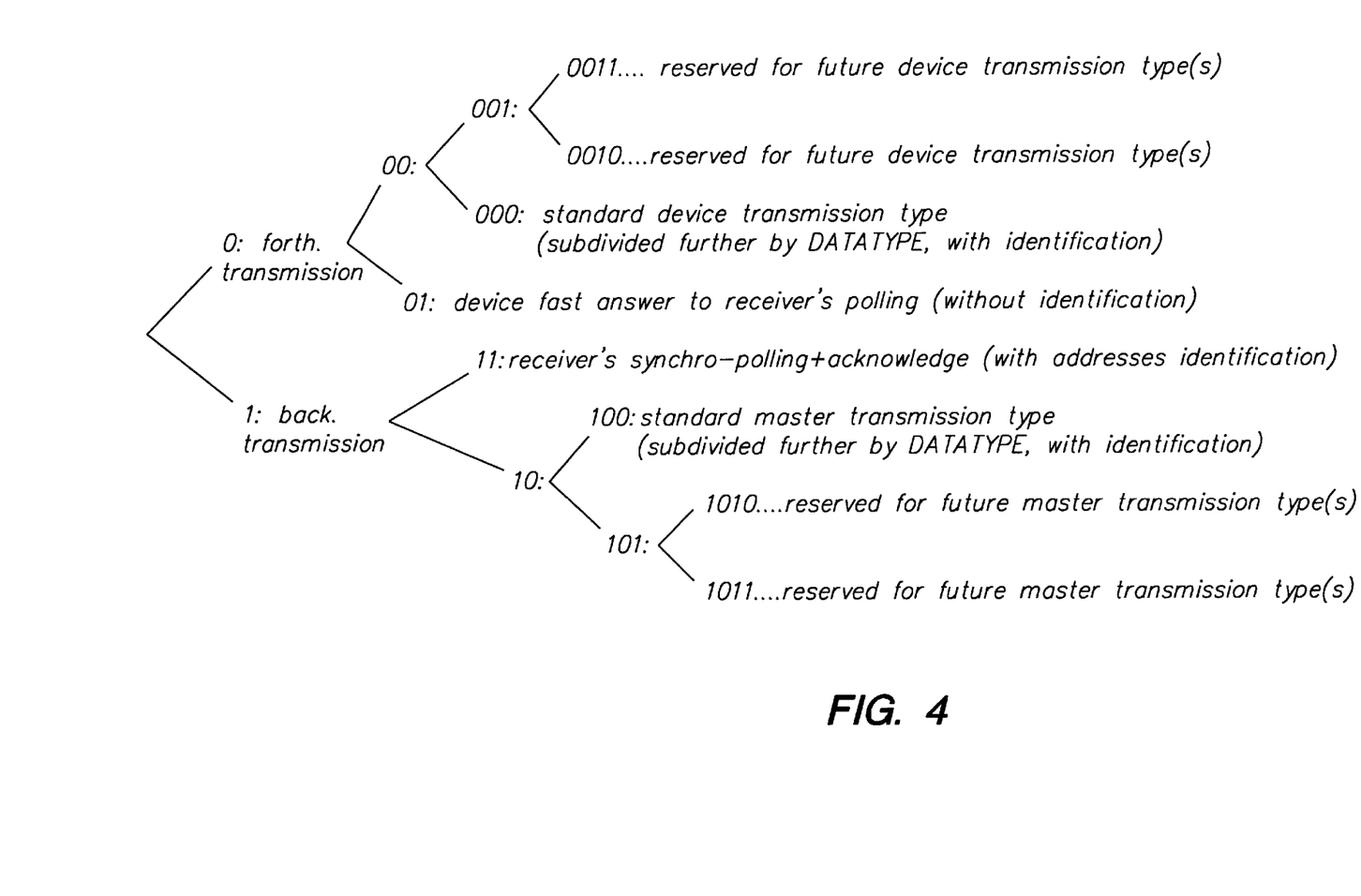
FIG. 4 shows in hierarchical form the types of contents available for the FRAMETYPE field available in the protocol of the current invention.

The FRAMETYPE field 210 is typically of a variable length, organized in a tree structure which reserves the shortest FRAMETYPEs to the frames that have to convey the fastest or shortest messages. The tree structure, or hierarchy, of the FRAMETYPE field 210 is shown in FIG. 4 and is arranged as follows: the first bit indicates whether the transmission is from the host to one of the various peripherals, or from a peripheral to the host. As a matter of convention, transmission from the host to a device may be considered "back" transmission, while transmission from a device to the host or master may be considered "forth" transmission. For the embodiment discussed herein, a 1 for the initial bit represents a "back" transmission, while a 0 represents a "forth" transmission.

The meaning of the second bit in the FRAMETYPE field 210 indicates if the message is of a faster, bidirectional exchange type, or of a slower form such as asynchronous uni-directional messages or less urgent bidirectional exchanges. Thus, for the embodiment described herein, if the first pair of bits of the FRAMETYPE field are 11, the message is the master—s synchronous fast polling of the receivers, which can include additional bits as part of other fields to provide addressee identification, or other characteristics as desired for a particular implementation.

Similarly, if the first pair of bits is 01, the message is a device's fast answer to a polling of the receivers from the host or master; although identification could be provided, in the presently preferred embodiment no identification is provided.

Figure 5:
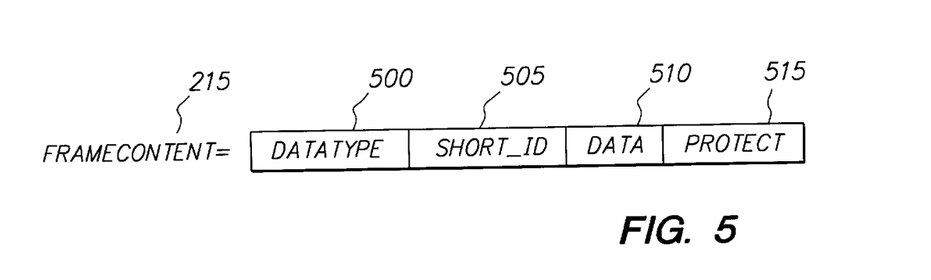
FIG. 5 shows the contents of the FRAMECONTENT field available in accordance with the protocol of the present invention.

If the second bit is a 0, the message is recognized as a slower type, and additional bits further identify the message. In the presently preferred embodiment, a value of 100 for the FRAMETYPE field 210 represents a standard transmission type from the master to the devices, where additional information may be provided as part of the FRAMECONTENT field 215, discussed hereinafter. Similarly, a value of 000 for the FRAMETYPE field represents a standard device transmission type, again with additional information available as part of the FRAMECONTENT field 215. Other values, such as 101 or 001, can be combined with additional bits for other transmission types which may be assigned according to a particular implementation.

The next field of a message is the FRAMECONTENT field 215, an exemplary structure of which is shown in FIG. 5. The FRAMECONTENT field includes, in its typical form, a DATATYPE field 500, a SHORT_ID field 505, a DATA field 510, and a PROTECT field 515. However, the content, format and bit count of the $SHORT_{13}$ ID 505 field and of the DATA field 510 will depend on the value of the DATATYPE field 500. The DATATYPE and $SHORT_{13}$ ID fields 500 and 505 typically identify the source of a device transmission. In addition, in response to certain message from the host, such as a synchronous polling, the FRAMECONTENT field 215 may be simplified to just DATA and PROTECT fields 510 and 515. It will be appreciated that the devices can receive messages from the host only in those instances in which bi-directional communications have been enabled. It is possible that an asynchronous message may be issued by another device during the relevant time period, but such a message would be rejected because it would not start with 01.

In the event the configuration includes a host and a plurality of peripheral devices, it may also be necessary for the host or master to synchronize the messages or emissions transmitted by the various peripherals, such as a plurality of interactive gamepads or joysticks. In such an instance, the objective is to allow each peripheral to transmit in its turn. In this arrangement, a very short string, referred to as "synchronous polling and acknowledge" may be issued by the host to the devices. The use of extremely short strings is preferred because it allows the most messages to fit in a given time slot, but it will be apparent to those skilled in the art that the exact length of a string may be adjusted according to the particular implementation. In each instance, the devices must be capable of bi-directional communication. For such short strings from the host to the devices, the FRAMECONTENT field may comprise an ADDRESSEE field and an ACK field. In such an arrangement, the ADDRESSEE field may be configured to identify the particular type of device being addressed. For example, an ADDRESSEE value of 1 may mean a plurality (e.g., four) gamepads in synchronization, or an ADDRESSEE value of 01 may mean a keyboard in synchronization with an asynchronous device. Other ADDRESSEE values, which may include additional bits, can represent different pluralities of gamepads in synchronization, or a plurality of joysticks in synchronization, or other combinations of devices. The ACK field is used simply to confirm correct receipt of the most recent action report sent by a peripheral device. For example, if the ACK field is not set, the polled device may be required to resent the last user-action report instead of a new one. It may also be preferable in some embodiments to simply ignore the last, unsuccessful report and send only a new one.

Figure 6:
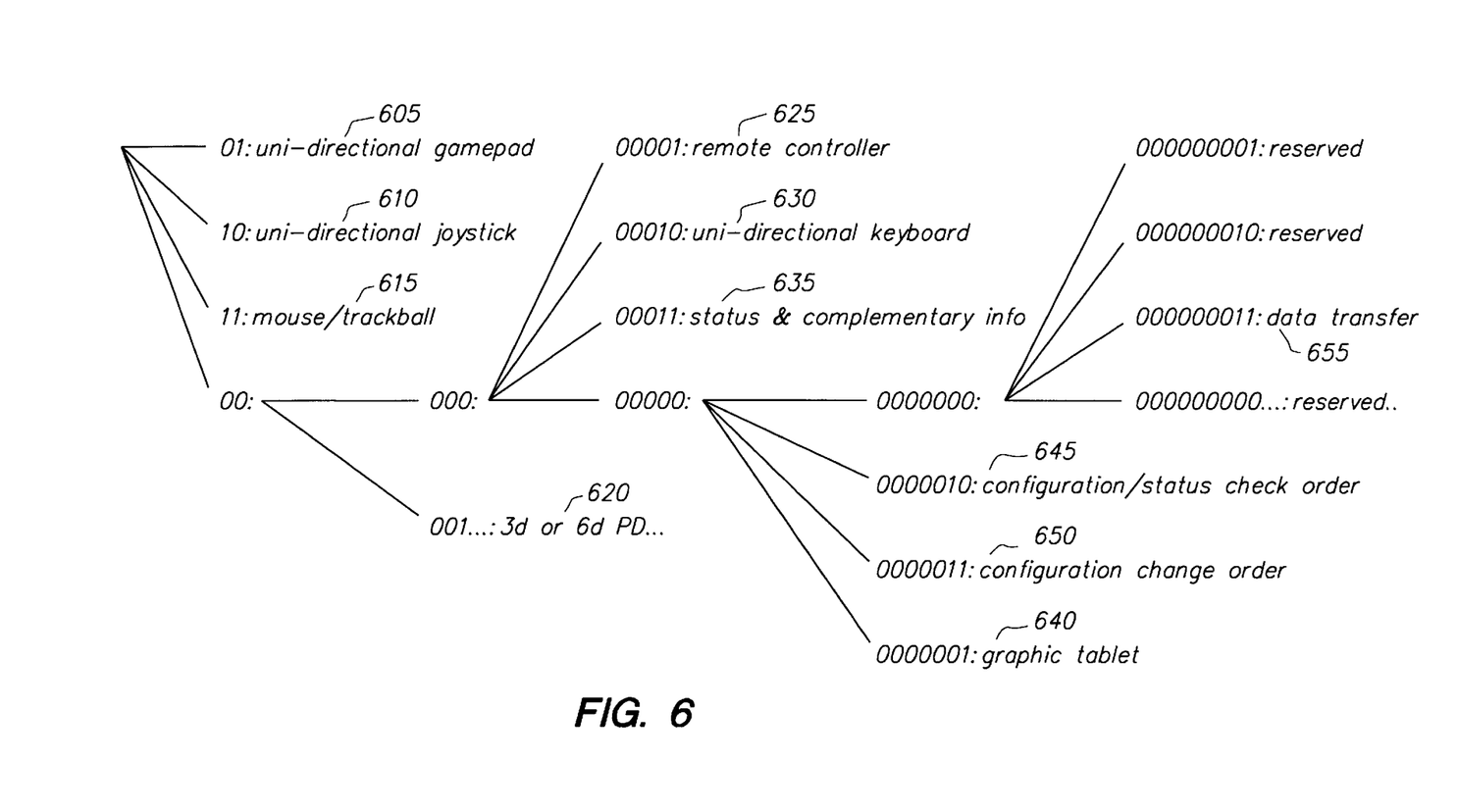
FIG. 6 shows in hierarchical form the contents of the DATATYPE field available as part of the FRAMECONTENT field associated with certain types of devices in accordance with the present invention.

The DATATYPE field 500 is, in an exemplary embodiment, not used during communication with polled or synchronized devices. It is, however, used with other transmissions regardless whether the direction of the communication is device to master in general, or master to device in bidirectional mode. The DATATYPE field, as shown in FIG. 6, is classified hierarchically in terms of the associated report rate; that is, devices having more serious time constraints get higher priority and shorter DATATYPE fields (as well as the shortest $SHORT_{13}$ ID field 505). In a presently preferred embodiment, unidirectional gamepads 605, unidirectional joysticks 610 and two-dimensional pointing devices (such as mice and trackballs) 615 are assigned such highest priority. A next level of priority is assigned to 3D and 6D pointing devices 620, with lower priorities for remote controllers 625, uni-directional keyboards 630, and status and complementary information reports 635. Still lower priorities may be assigned to various encoded-key devices such as graphic tablets 640, status check orders 645, configuration change orders 650, large data transfers 655, and so on. It will be apparent from the arrangement of FIG. 6 that the shorter the length of the DATATYPE field, the higher the priority. It will also be appreciated that other, lower priority devices can simply be added by increasing the number of 20 bits in the DATATYPE field.

Figure 7:
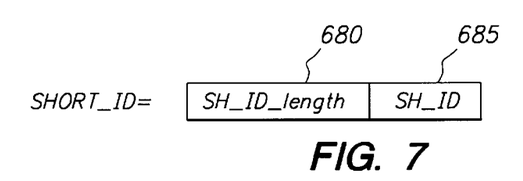
FIG. 7 shows the content of the SHORT-ID field associated with some devices in accordance with the present invention.

The next field included in the FRAMECONTENT field shown in FIG. 3 is the $SHORT_{13}$ ID field, the content of which is shown in FIG. 7. The $SHORT_{13}$ ID field comprises an SH_ID_Length 680 and an SH_ID value 685. The purpose of the SHORT_ID field is simply to permit the host receiver to recognize and separate messages coming from two or more devices that provide reports of the same DATATYPE, without requiring transmission of the full 16-bit PnP identifier. A prerequisite is that the host receiver already knows the PnP identifier of the device sending the short ID, which should be the case as this type of information is normally transmitted from the devices to the host as part of the status-and-complementary-info messages.

As noted above with DATATYPE, synchronized or polled devices do not emit a SHORT_ID at all since they emit only when the host receiver expects them to. In an exemplary embodiment, the SHORT_ID field may be either three to eight bits, with the number of bits matched to the number of devices of a single type expected to be in communication with the host. If the DATATYPE field indicates that a SHORT_ID field should exist, but none exists, it has been found preferable in one embodiment to fill the field with zeros. Other embodiments offer different options. Also, in a preferred embodiment the SHORT_ID is transmitted least significant bit first.

In most messages, the SHORT_ID will be that of the sender. However, in the event of either a configuration/status check order or a configuration change order message, the ID included in the message will be that of the addressee. In some embodiments, such as when the address of the addressee is not known, it may be desired to send a neutral SHORT_ID. In many, but not all, embodiments the addressee will be required to accept such an addressed order.

Some devices, such as an integrated mouse and remote-controller, may represent a single physical device, while at the same time representing a plurality of logical devices with each logical device sending its own reports. In a presently preferred embodiment, the SHORT_ID is associated with the single physical device, and that same ID is used for the reports generated by each of the logical devices. Other approaches may be implemented in other embodiments.

The next field referred to in the FRAMECONTENT structure of FIG. 5 is the DATA field 510. The format of the DATA field 510 will vary with the type of device, such as gamepads, joysticks, tablets, electronic mice and other relative-displacement devices, 3D or 6D pointing devices, remote controllers, and keyboards. In addition, the DATA field may include data for other types of messages, such as status-and-complementary-information, configuration/ status-check-order and configuration-change-order. In an exemplary embodiment, the data is sent and received LSB first.

Figure 8:
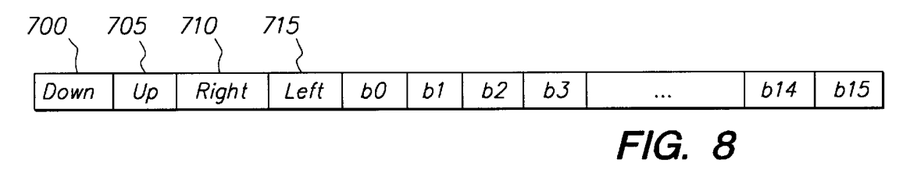
FIG. 8 shows the structure of the contents of the DATA field for asynchronous non-multiplexed switches such as uni-directional gamepads.

Since the content of the DATA field can vary with the device, different data structures are used for the DATA field for different devices. Shown in FIG. 8 is an exemplary data structure for the DATA field for uni-directional gamepads and other asynchronous switches which are not multiplexed. The structure may be generally characterized as providing information for eight directions and sixteen buttons, coded on 20 bits. Other combinations may be used in some embodiments, including special configurations such as coding on one bit when a button is pressed. The data in FIG. 8 may be seen to include a DOWN bit 700, an UP bit 705, a RIGHT bit 710, and a LEFT bit 715. When used in combination, these four direction bits normally code for eight directions. In addition, a plurality of bits, which may be on the order of up to sixteen bits, are assigned to represent various buttons on the gamepad.

It will be apparent that the normal, possible arrangement of the four direction bits is either a single bit on, or certain physically possible combinations. The remaining combinations, deemed to physically impossible, may then be used to indicate other functions. In an exemplary embodiment, an autofire function may be activated if all four direction bits are one, or a button may be marked continuously on if the DOWN, UP and RIGHT bits are all marked one. To minimize power consumption, the autofire function or other similar continuous-on functions are preferably maintained by the host receiver, since this minimizes power consumption at the remote device.

Figure 9:
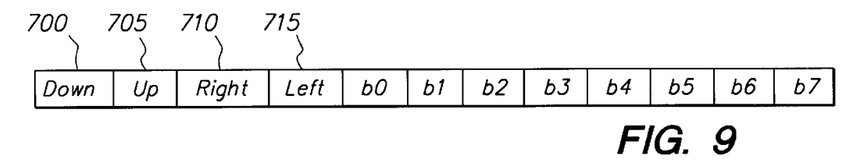
FIG. 9 shows the structure of the contents of the DATA field for polled or synchronous non-multiplexed switches such as bi-directional gamepads.

Referring now to FIG. 9, the DATA structure is shown for devices such as bi-directional gamepads or other polled or synchronized switches which are not multiplexed. The implementation is similar to that in FIG. 8, and includes four direction bits 700, 705, 710, and 715. In addition, a plurality of bits (for example, eight) may be assigned for buttons, as with the data structure shown in FIG. 8. In addition, since the devices using the DATA structure of FIG. 9 can be polled, such devices should not respond to a poll if no button is depressed.

Figure 10A:
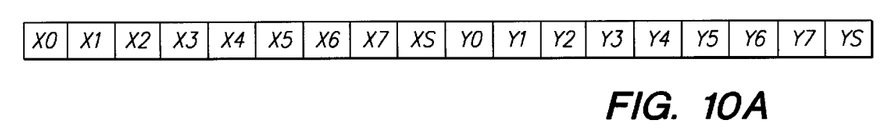
FIG. 10A shows the structure of the contents of the DATA field for asynchronous XY-absolute position plus switches such as uni-directional joysticks.
Figure 10B:
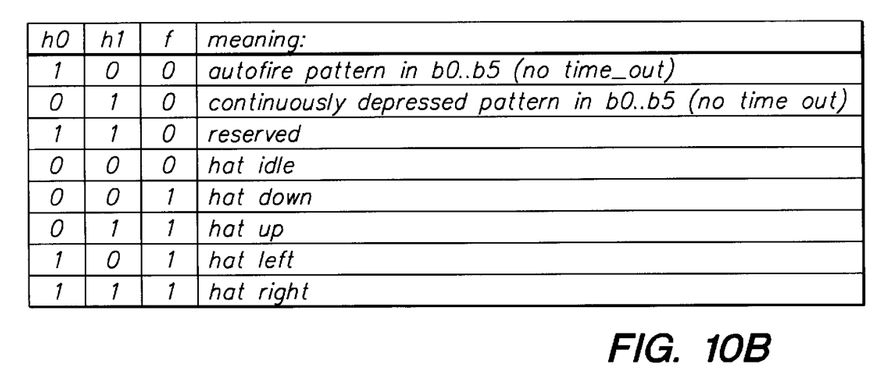
FIG. 10B shows the structure of the contents of the DATA field for transmitting button, hat and special function information for unidirectional joysticks and similar devices.

Referring next to FIGS. 10A and 10B, the DATA structure for either unidirectional or bi-directional joysticks may be better understood. Such devices may be thought of in more general terms as XY-absolute-position devices which also have switches, and may be either asynchronous (unidirectional) or polled/synchronized (bi-directional). In an exemplary embodiment, such joystick-type devices report displacement for both X and Y directions, encoded on eight bits plus sign as X0 through X7 plus XS and Y0 through Y7 plus YS. In addition, such devices also report on a separate transmission the button state (shown in FIG. 10B as b0 through b5), plus three bits for hat (a four-direction knob), autofire function and continuously on function. An exemplary encoding of the three bits for hat, autofire and continuously on are better described in FIG. 10C. Tablets may be managed in a similar manner, with each X or Y position coded on a relatively high number of bits, for example sixteen or more.

Figure 11A:
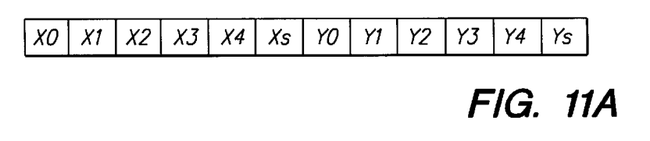
FIG. 11A shows the structure of the contents of the DATA field for XY- displacement plus switches, such as electronic mice or similar relative-displacement devices.
Figure 11B:
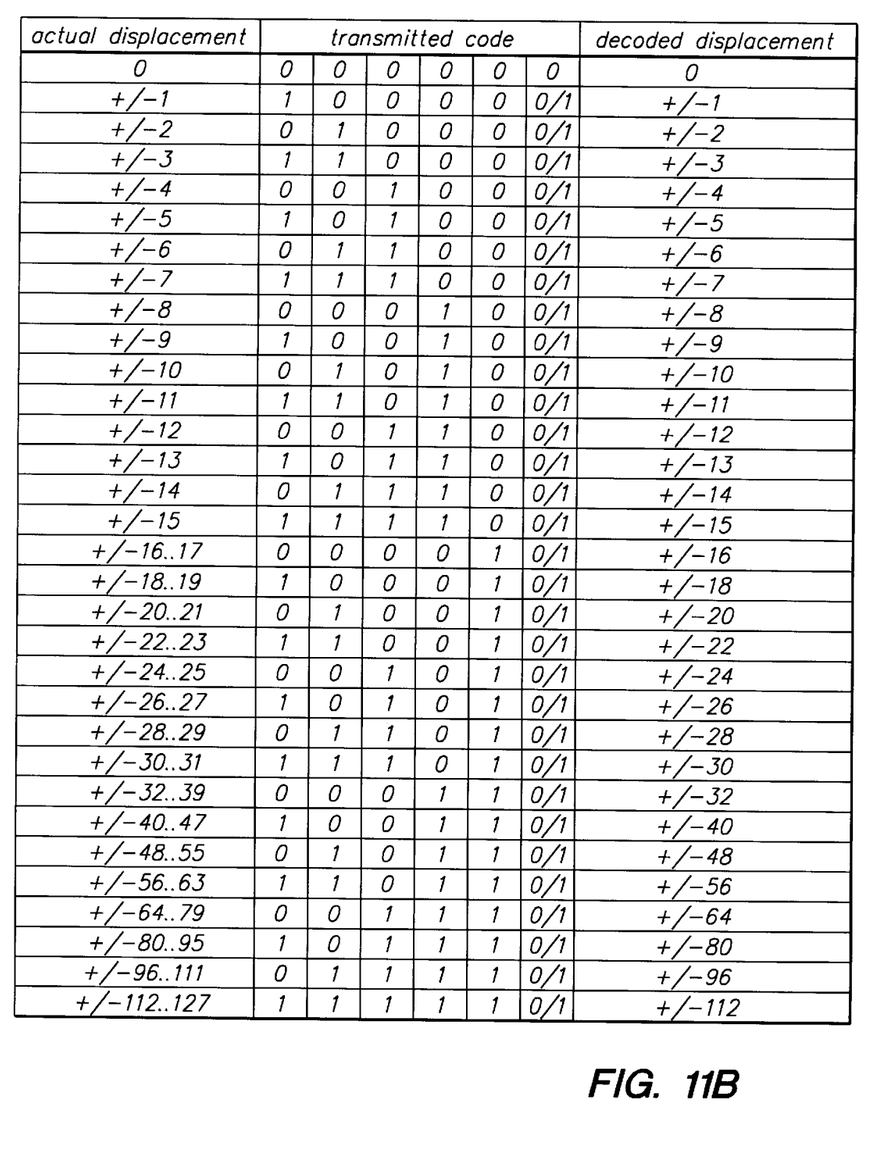
FIG. 11B shows the data compression table for data transmissions from XY-displacement plus switches, such as electronic mice or similar relative-displacement devices.

The DATA structure for electronic mice and other relative-displacement devices can be better appreciated from FIGS. 11A–11B. In an exemplary implementation, such two-dimensional, relative-displacement devices report displacement coded on five bits plus sign, compressed to provide eight bit resolution. As such, the data structure shown in FIG. 11A reflects four X-direction bits, X0–X4, plus sign (XS), and four Y-direction bits, Y0–Y4 plus YS, with the table of FIG. 11B illustrating the compression algorithm used in an exemplary embodiment.

In addition to the displacement characteristics described in FIGS. 11A–11B, in other reports the state of the buttons or switches of the device are reported. In an exemplary embodiment, such buttons are reported by placing the X portion of the message in a known, physically impossible state, such as a displacement of –0, and letting the status of the buttons occupy the Y-displacement positions. Parity on the reporting of the buttons may also be provided.

Figure 12:
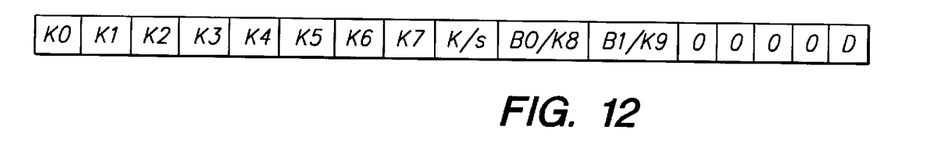
FIG. 12 shows the structure of the contents of the DATA field for asynchronous encoded key switches such as remote controllers.

Referring next to FIG. 12, the data structure of remote controllers may also be appreciated. In an exemplary embodiment, the data structure for remote controllers, which may be thought of in more general terms as asynchronous encoded key switches, includes one bit to indicate whether a button is depressed or released, and one bit to indicate the type of coding, e.g., keycode or scancode. In addition, the structure includes, if scancodes are used, eight bits (K0 through K7) for scancodes plus two bits for scancode-banks. Alternatively, if keycodes are used, the structure includes ten bits (K0 through K9) for keycodes. Four additional bits may also be provided, to permit additional functions.

Figure 13:
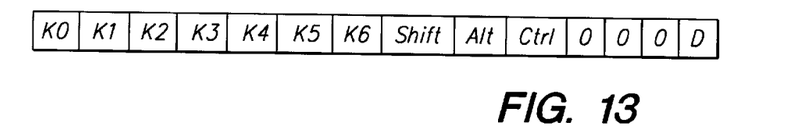
FIG. 13 shows the structure of the contents of the DATA field for asynchronous encoded key switches such as uni-directional keyboards.

Referring next to FIG. 13, the DATA structure for unidirectional keyboards may be better understood. In more general terms such devices may be described as asynchronous, encoded key switches, and report to the host any time a key or key combination is depressed or released. In an exemplary embodiment, the data structure can report 127 physical keys, encoded on seven bits (K0 through K6), as well as additional function keys coded on SHIFT, ALT and CTRL, plus three additional function bit set at 000 until needed, and one "button depressed/released" bit, D, which can be set to a one if a button has been depressed, or a zero if the button was released.

Figure 14:
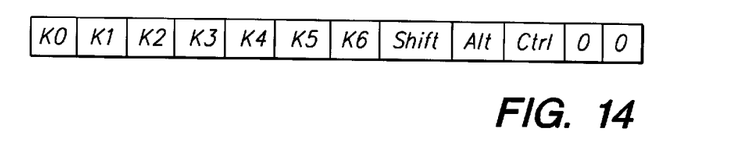
FIG. 14 shows the structure of the contents of the DATA field for polled encoded key switches such as bi-directional keyboards.

Referring next to FIG. 14, the DATA structure for bi-directional keyboards may be better appreciated. Such devices may be more generally thought of as polled encoded key switches, and work only in bi-directional mode when polled by a host or master. At each polling the keyboard answers the code of any key which has been depressed, encoded on K0–K6, plus the individual states of the additional function keys, encoded on the SHIFT, ALT and CTRL bits. Two or more additional bits may be provided for expanded functionality.

Figure 15:
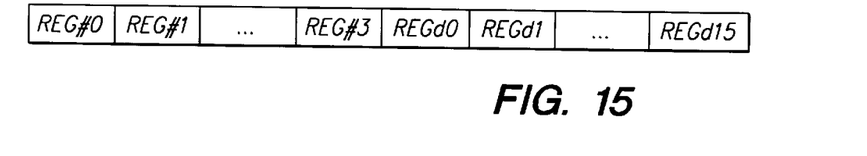
FIG. 15 shows the structure of the contents of the DATA field for status and complementary information.

As previously noted, messages other than reports from devices may also make use of the DATA field. One such message is status-and-complementary-information, which is organized in a register and register index format as shown in FIG. 15. Both the registers and the register indexes are LSB first, and the DATA field for such a message first contains a register index in the form REG#, followed by the content of that register. That data structure thus includes a plurality of register index bits, in this example REG#0 through REG#3 to allow addressing of sixteen registers, followed by their respective contents, REGd0 through REGd15. Information which may be provided through this message includes a full 16-bit product ID for Plug 'n Play (PnP) compatibility, battery status, or other reports specific to the peripheral device. For example, for a mouse, the status-and-complementary information may include encoding for the number of dots per inch, sensor type, device type, whether ballistic acceleration is implemented, or whether ergonomic resolution has been implemented.

A similar data structure is used for the configuration-change-order message, which is usually transmitted by the master to change parameters of a bi-directional device. As above, the data structure comprises the register index bits, followed by the register contents.

Figure 16:
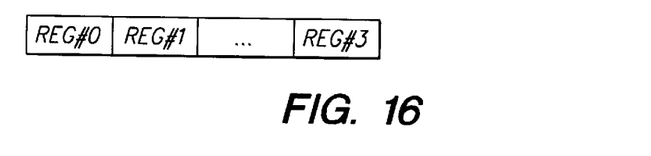
FIG. 16 shows the structure the contents of the DATA field for configuration/status-check-order.

The status-and-complementary-information is usually sent by a device in response to a configuration/status check order received from the host or master. The DATA structure for a configuration/status check order message is shown in FIG. 16, and includes only the index of the register to be sent back in response. As such, the DATA structure for such a message is only four bits, from REG#0 through REG#3.

Figure 17:
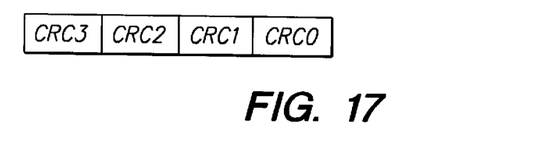
FIG. 17 shows the structure of the PROTECT field shown in FIG. 5.

Finally, the last remaining field in the FRAMECONTENT field is the PROTECT field 515. In an exemplary embodiment, the PROTECT field provides CRC protection of four bits length, CRC0 through CRC3, as shown in FIG. 17. The PROTECT field is sent and received MSB first, and protects all but the synchro-polling-&-acknowledge messages. The PROTECT field also protects various fields, including FRAMETYPE, DATATYPE, SHORT_ID and DATA.

The protocol by which the various frames described above will be successively sent varies, depending on whether only unidirectional devices or bi-directional devices are used. For example, as long as a user does not use two asynchronous uni-directional devices simulatenously, any number of such devices may work together, and each will transmit only when it generates a user action report. Multiple function, uni-directional devices simply generate user action reports corresponding to the movement or action detected. If two messages should overlap due to simultaneous use of multiple such devices, a collision may occur and both messages may be rejected for safety.

Status-and-complementary-information interruption will usually be sent, in an exemplary embodiment, when no movement of the device or actuation of its buttons has occurred for a threshold period. Such reports can be interrupted abruptly in a user action report is required to be sent.

Bi-directional communication can fall into two types, depending on whether all of the devices can be polled, or whether the devices include some asynchronous devices and some polled devices. If some asynchronous devices are included, such as a mouse, the host receiver responds to action reports from the mouse, but also polls the bi-directional device (e.g., a keyboard) whenever the mouse is not sending. In addition, the mouse report is structured to leave enough time between reports to permit the receiver to send a polling message and allow the keyboard to answer.

If all the devices are bi-directional, and can be polled, the protocol implemented in a preferred embodiment including sending out a synch-poll signal at the beginning of a cycle, and then waiting for each device having something to report to emit a response to the poll.

It can thus be appreciated that a new and novel method and apparatus for communications between a plurality of devices and a single host has been disclosed. Having fully described one embodiment of the present invention, it will be apparent to those of ordinary skill in the art that numerous alternatives and equivalents exist which do not depart from the invention set forth above. It is therefore to be understood that the invention is not to be limited by the foregoing description, but only by the appended claims.

What is claimed is:

1. A computer based method for wireless communication between a host computer and first and second peripheral devices, said host computer including a receiver for receiving data in the form of electromagnetic signals at a first frequency from said first and second peripheral devices, the method comprising the steps of:

receiving a first of said electromagnetic signals from the first peripheral device representing a first data message said first data message having a first priority level corresponding to a data-type of said first data message and said first peripheral device having a second priority level;

controlling the size of said first electromagnetic signal, said first data message having a first portion and a second portion, including the steps of:

setting a first size of said first portion proportional to said first priority level, and setting a second size of said second portion proportional to said second priority level wherein said second portion includes a first type-field and a first identification field, wherein said step of setting a second size includes the steps of:

setting said first type-field to a value representing a type of said first peripheral device wherein a size of said first type-field is proportional to said second priority level;

setting said first identification field to a value representing said first peripheral device characteristics, said first identification signal having a first size, if said second priority level corresponds to a low priority; and setting said first identification field to a value representing a subset of said first peripheral device characteristics, said first identification signal having a second size, if said second priority level corresponds to a high priority, wherein said second size is less than said first size;

wherein said host computer recognizes the first peripheral as the source of said first electromagnetic signal based upon said first identification field;

receiving a second of said electromagnetic signals from the second peripheral device representing a second data message said second data message having a third priority level corresponding to a data-type of said first data message and said first peripheral device having a fourth priority level;

controlling the size of the second electromagnetic signal, said second data message having a third portion and a fourth portion, including the steps of:

setting a third size of said third portion proportional to said third priority level, and setting a fourth size of said fourth portion proportional to said fourth priority level; and receiving at the host computer a first peripheral data signal, said first peripheral data signal representing first peripheral device characteristics.

2. The method of claim 1, wherein said electromagnetic signals are encoded using Miller encoding.

3. The method of claim 1, wherein said first peripheral device is a first type of device and said second peripheral device is a second type of device.

4. The method of claim 3, wherein said first type of device is different from said second type of device.

5. The method of claim 3, wherein said first type of device is the same as said second type of device.

6. The method of claim 1, wherein said second portion includes a displacement portion representing one of a displacement value and a control signal of said first peripheral device, the step of setting a second size including the steps of:

decoding a displacement value of said displacement portion representing a value in a first range, said first range exceeding $2^N$ displacement units, where N is equal to the number of bits in the displacement portion, said displacement value representing a small movement of said first peripheral device with an substantially equivalent value of said displacement units, said displacement value representing larger movements of said first peripheral device with one value of said displacement units representing a second range of said displacement units.

7. The method of claim 1, wherein said fourth portion includes a second type-field and a second identification field, wherein said step of setting a fourth size includes the steps of:

setting said second type-field to a value representing a type of said second peripheral device wherein a size of said second type-field is proportional to said fourth priority level;

setting said second identification field to a value representing said second peripheral device characteristics, said second identification signal having a third size, if said fourth priority level corresponds to a low priority; and     setting said second identification field to a value representing a subset of said second peripheral device characteristics, said second identification signal having a fourth size, if said fourth priority level corresponds to a high priority, wherein said fourth size is less than said third size;

wherein said host computer recognizes the second peripheral as the source of said second electromagnetic signal based upon said second identification field.

8. The method of claim 7, wherein said fourth portion includes a displacement portion representing one of a displacement value and a control signal of said second peripheral device, the step of setting a fourth size including the steps of:

decoding a displacement value of said displacement portion representing a value in a first range, said first range exceeding $2^N$ displacement units, where N is equal to the number of bits in the displacement portion, said displacement value representing a small movement of said second peripheral device with an substantially equivalent value of said displacement units, said displacement value representing larger movements of said second peripheral device with one value of said displacement units representing a second range of said displacement units.

9. The method of claim 8, wherein said electromagnetic signals are encoded using Miller encoding.

10. A computer based system for wireless communication comprising:

first and second peripheral devices;

a host computer having a receiver for receiving data in the form of electromagnetic signals at a first frequency from said first and second peripheral devices, said electromagnetic signals from the first peripheral device representing a first data message said first data message having a first priority level corresponding to a data-type of said first data message and said first peripheral device having a second priority level; and     first control means, disposed to communicate with said receiver, for controlling the size of said first electromagnetic signal said first data message having a first portion and a second portion said control means having:

first setting means for setting a first size of said first portion proportional to said first priority level, and     second setting means, for setting a second size of said second portion proportional to said second priority level wherein said second portion includes a first type-field and a first identification field, wherein said second setting means includes:

fifth setting means, for setting said first type-field to a value representing a type of said first peripheral device wherein a size of said first type-field is proportional to said second priority level;

sixth setting means, for setting said first identification field to a value representing said first peripheral device characteristics, said first identification signal having a first size, if said second priority level corresponds to a low priority; and     seventh setting means, for setting said first identification field to a value representing a subset of said first peripheral device characteristics, said first identification signal having a second size, if said second priority level corresponds to a high priority, wherein said second size is less than said first size;

wherein said host computer recognizes the first peripheral as the source of said first electromagnetic signal based upon said first identification field;

wherein said receiver receives a second of said electromagnetic signals from the second peripheral device representing a second data message, said second data message having a third priority level corresponding to a data-type of said first data message and said first peripheral device having a fourth priority level; and     second control means, disposed to communicate with said receiver, for controlling the size of the second electromagnetic signal said second data message having a third portion and a fourth portion, said second control means having:

third setting means for setting a third size of said third portion proportional to said third priority level and     fourth setting means, for setting a fourth size of said fourth portion proportional to said fourth priority level;

wherein said receiver receives a first peripheral data signal, said first peripheral data signal representing first peripheral device characteristics.

11. The system of claim 10, wherein said second portion includes a displacement portion representing one of a displacement value and a control signal of said first peripheral device, the second setting means includes:

first decoding means, for decoding a displacement value of said displacement portion representing a value in a first range, said first range exceeding $2^N$ displacement units, where N is equal to the number of bits in the displacement portion, said displacement value representing a small movement of said first peripheral device with an substantially equivalent value of said displacement units, said displacement value representing larger movements of said first peripheral device with one value of said displacement units representing a second range of said displacement units.

12. The system of claim 10, wherein said fourth portion includes a second type-field and a second identification field, wherein said fourth setting means includes:

eighth setting means, for setting said second type-field to a value representing a type of said second peripheral device wherein a size of said second type-field is proportional to said fourth priority level;

ninth setting means, for setting said second identification field to a value representing said second peripheral device characteristics, said second identification signal having a third size, if said fourth priority level corresponds to a low priority; and     tenth setting means, for setting said second identification field to a value representing a subset of said second peripheral device characteristics, said second identification signal having a fourth size, if said fourth priority level corresponds to a high priority, wherein said fourth size is less than said third size;

wherein said host computer recognizes the second peripheral as the source of said second electromagnetic signal based upon said second identification field.

13. The system of claim 12, wherein said fourth portion includes a displacement portion representing one of a displacement value and a control signal of said second peripheral device, the fourth setting means including:

first decoding means, for decoding a displacement value of said displacement portion representing a value in a first range, said first range exceeding $2^N$ displacement units, where N is equal to the number of bits in the displacement portion, said displacement value representing a small movement of said second peripheral device with an substantially equivalent value of said displacement units, said displacement value representing larger movements of said second peripheral device with one value of said displacement units representing a second range of said displacement units.

14. The system of claim 13, wherein said electromagnetic signals are encoded using Miller encoding.

* * * * *